M. CLINE.
Egg-Beater.
No. 160,815. Patented March 16, 1875.
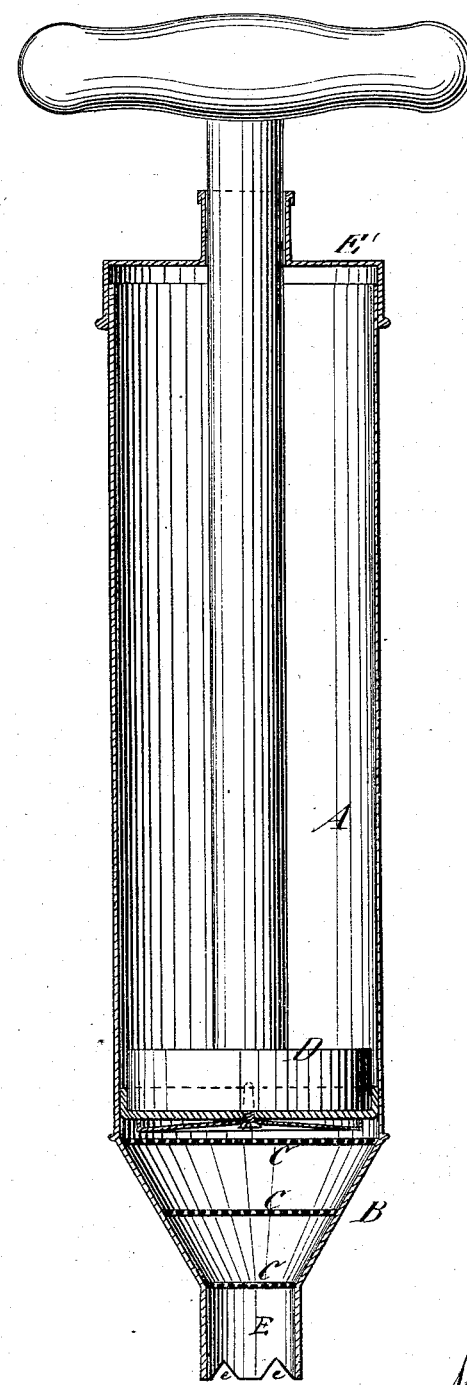
WITNESSES:
INVENTOR:
Martin Cline
BY
ATTORNEYS.

UNITED STATES PATENT OFFICE.

MARTIN CLINE, OF CHICAGO, ILLINOIS, ASSIGNOR TO HIMSELF AND WILLIAM J. CLINE, OF SAME PLACE.

IMPROVEMENT IN EGG-BEATERS.

Specification forming part of Letters Patent No. 160,815, dated March 16, 1875; application filed September 19, 1874.

*To all whom it may concern:*

Be it known that I, MARTIN CLINE, of Chicago, Illinois, have invented an Improved Egg-Beater, of which the following is a specification:

The drawing is a sectional elevation.

The invention will first be fully described, and then pointed out in the claim.

A represents the cylinder, and D the piston, ordinarily used with a perforated bottom for egg-beating. To this I add the downwardly-tapering nozzle B, the downwardly-decreasing reticulated diaphragms C C C, and the rest E, having bottom notches *e*.

By this improved construction I prevent the accidental dislocation of the diaphragms, and allow the beater to be held firmly against the bottom of dish into which the eggs are broken, while egg substance is more gradually drawn up and less crowded in its passage upward than when it is forced downward by the piston, thus dividing it on the upward throw, and again subdividing it on the downward throw, of piston.

I am aware of the patent granted, August 28, 1866, to E. C. Strange, and numbered 57,596, and hereby disclaim what is therein described.

What I claim is—

The combination, in an egg-beater with cylinder A and handled piston D, of the nozzle B, tapered, provided with varying diaphragms C, and having end-notched rest E *e*, as shown, and for the purpose specified.

MARTIN CLINE.

Witnesses:
 WILLIAM JOSEPH CLINE,
 GEORGE AUGUSTAIN CLINE.